US008176567B2

(12) United States Patent
Kirschner et al.

(10) Patent No.: US 8,176,567 B2
(45) Date of Patent: May 8, 2012

(54) APPARATUS AND METHOD TO LIMIT ACCESS TO SELECTED SUB-PROGRAM IN A SOFTWARE SYSTEM

(75) Inventors: Wesley A. Kirschner, Farmington, CT (US); Gary S. Jacobson, Norwalk, CT (US); John A. Hurd, Torrington, CT (US); Walter J. Baker, Stratford, CT (US)

(73) Assignee: Pitney Bowes Inc., Stamford, CT (US)

( * ) Notice: Subject to any disclaimer, the term of this patent is extended or adjusted under 35 U.S.C. 154(b) by 1718 days.

(21) Appl. No.: 11/317,463

(22) Filed: Dec. 22, 2005

(65) Prior Publication Data

US 2007/0150729 A1 Jun. 28, 2007

(51) Int. Cl.
*G06F 7/04* (2006.01)
*G06F 17/30* (2006.01)
*H04N 7/16* (2006.01)

(52) U.S. Cl. .......................................... 726/29

(58) Field of Classification Search ...................... 726/29
See application file for complete search history.

(56) References Cited

U.S. PATENT DOCUMENTS

| 3,366,929 A * | 1/1968 | Mullery et al. ............... 712/242 |
| 6,412,071 B1 * | 6/2002 | Hollander et al. ............. 726/23 |
| 6,658,578 B1 * | 12/2003 | Laurenti et al. ............... 713/324 |
| 2003/0014673 A1 * | 1/2003 | Baum et al. .................... 713/202 |
| 2006/0004726 A1 * | 1/2006 | Blank ............................... 707/3 |

* cited by examiner

*Primary Examiner* — Kambiz Zand
*Assistant Examiner* — Stephen Sanders
(74) *Attorney, Agent, or Firm* — George M. Macdonald; Charles R. Malandra, Jr.; Steven J. Shapiro

(57) ABSTRACT

A method includes receiving at a sub-program a request from an external entity the request comprising at least one parameter and a return address, utilizing the return address and an address list associated with the sub-program to authenticate the external entity, and processing the request if the external entity is authenticated.

27 Claims, 5 Drawing Sheets

FIG.4

```
Some_return_value_type SUB_PROGRAM_NAME(some_parameter(s),return address)
Begin
    If (AnthenticatedCaller() than
    begin
        Perform Protected operations...
        .
        .
        Copy resultant operation data to some_parameter
    end
    return (status);
end
```

FIG.5

```
Some_return_value_type SUB_PROGRAM_NAME(some_parameter(s),return address)
Begin
    Perform Protected operations
    .
    .
    If (AnthenticatedCaller() than
    begin
        Copy resultant operation data to some_parameter
    else
        Wipe the operation data
    end
    return (status);
end
```

APPARATUS AND METHOD TO LIMIT ACCESS TO SELECTED SUB-PROGRAM IN A SOFTWARE SYSTEM

BACKGROUND OF THE INVENTION

1. Field of the Invention

The present invention relates generally to a system and method for limiting access to sub-programs in a software system.

2. Background Information

With reference to FIG. 1, there is illustrated a logical diagram of a typical software system 10 formed of a number of software programs 11-1 to 11-5 and attendant sub-programs 13-6 to 13-8. Each of exemplary user interface program 11-2, security operation program 11-4, funds operations program 11-5, and hardware control program 11-3 is capable of being executed at the request of the operating system program 11-1. Likewise, the exemplary sub-programs 13-6 to 13-8 are capable of being executed by their corresponding programs 11-4, 11-5, 11-3 respectively. For example, security operations program 11-4 is capable of issuing a call to invoke one or more functions embodied in security management sub-program 13-6. Similarly, funds operations program 11-5 is capable of issuing a call to invoke one or more functions embodied in funds management sub-program 13-7. Likewise, hardware control program 11-3 is capable of issuing a call to invoke one or more functions embodied in hardware access sub-program 13-8.

As used herein, "program" refers to machine readable code stored on an electronic medium that is capable of being invoked via the execution of a command contained within operating system program 11-1. Furthermore, as used herein, "sub-program" refers to a function, or collection of functions (also sub-programs), that may be invoked via a call from a program or other sub-program. As such, for example, security management sub-program 13-6 is either one sub-program, or a collection of more than one sub-programs related by a common functionality (in this case, security management).

Typically, sub-programs 13-6 to 13-8 perform sensitive tasks, such as those related to security, hardware access, or funds management. Such sub-programs 13-6 to 13-8 are therefore enabled to access and alter sensitive data. It is therefore important to prevent nefarious access to the invocation of the sub-programs 13-6 to 13-8. To maintain secure access to the sub-programs 13-6 to 13-8, the sub-programs 13-6 to 13-8 are typically stored in memory internal to the microprocessor that is to execute the sub-programs 13-6 to 13-8. Examples of such internal memories include flash memory and RAM.

However, sequestering the sub-programs 13-6 to 13-8 in internal memory is not always sufficient to guarantee that undesirable and potentially nefarious access to the operations of the sub-programs is prevented. Often times, the software forming the programs 11 and sub-programs 13 are authored by more than one individual or company. The programs 11 and sub-programs 13 are subsequently integrated to form a single executable image. Under normal operating conditions, there are no restrictions placed on the entities which can invoke sub-programs. As a result, for example, systems that utilize security and funds management can be compromised by software utilizing security and funds management sub-programs 13-6, 13-7 in a manner outside the designed parameters of the system.

As illustrated, execution of the operating system program 11-1 results in the coordination of the execution of programs 11-2 to 11-5. Such coordination is typically performed through the use of an Operating System's intertask messages. As noted above, sub-programs 13-6, 13-7, and 13-8 are accessed by their corresponding programs 11-4, 11-5, 11-8, respectively.

However, because traditional implementations do not restrict calls from one sub-program to another sub-program, an opportunity for unauthorized or unwanted access to the sub-programs exists. With reference to FIG. 2, there is illustrated the exemplary typical software system 10 of FIG. 1 wherein there is indicated communication between sub-programs. Specifically, hardware access sub-program 13-8 is illustrated as making direct calls to security management sub-program 13-6 and funds management sub-program 13-7. As a result, malicious code operating in the hardware access sub-program 13-8 can make direct calls to both security management sub-programs 13-6 and funds management sub-programs 13-7. Such malicious code may operate to misallocate funds or circumvent security procedures.

There is therefore needed a method by which malicious code forming a sub-program can be prevented from accessing the operation of other sub-programs.

SUMMARY OF THE INVENTION

In accordance with an embodiment of the invention, a method includes receiving at a sub-program a request from an external entity the request comprising at least one parameter and a return address, utilizing the return address and an address list associated with the sub-program to authenticate the external entity, and processing the request if the external entity is authenticated.

In accordance with an alternative embodiment of the invention, a method includes associating with a sub-program at least one address list including an address range of at least one valid requesting entity, receiving at the sub-program a request from a requesting entity including at least one parameter and a return address of the requesting entity, utilizing the return address and the at least one address list to determine if the requesting entity includes one of the valid requesting entities; and performing a plurality of operations on at least one datum in response to the request if the requesting entity comprises one of the valid requesting entities.

In accordance with an alternative embodiment of the invention, a method includes associating with a sub-program at least one address list including an address range of at least one valid requesting entity, receiving at the sub-program a request from a requesting entity comprising at least one parameter and a return address of the requesting entity, copying at least one datum to at least one duplicate datum, performing a plurality of operations on the at least one duplicate datum in response to the request, and utilizing the return address and the at least one address list to determine if the requesting entity includes one of the valid requesting entities, and erasing the at least one duplicate datum if the requesting entity does not include one of the valid requesting entities.

In accordance with an alternative embodiment of the invention, a program of machine-readable instructions, tangibly embodied on an information bearing medium and executable by a digital data processor, performs actions directed toward authenticating a request to a sub-program, the actions including receiving at a sub-program a request from an external entity the request including at least one parameter and a return address, utilizing the return address and an address list associated with the sub-program to authenticate the external entity, and processing the request if the external entity is authenticated.

In accordance with an alternative embodiment of the invention, a postal security device (PSD) includes an element for receiving at a sub-program a request from an entity the request including at least one parameter and a return address of the entity, an element for utilizing the return address and an address list associated with the sub-program to authenticate the external entity, and an element for processing the request only if the external entity is authenticated.

BRIEF DESCRIPTION OF THE DRAWINGS

The foregoing aspects and other features of the present invention are explained in the following description, taken in connection with the accompanying drawings, wherein:

FIG. 4 is an exemplary embodiment of code for practicing the invention.

FIG. 5 is an exemplary embodiment of code for practicing the invention.

DETAILED DESCRIPTION

Figure 1:
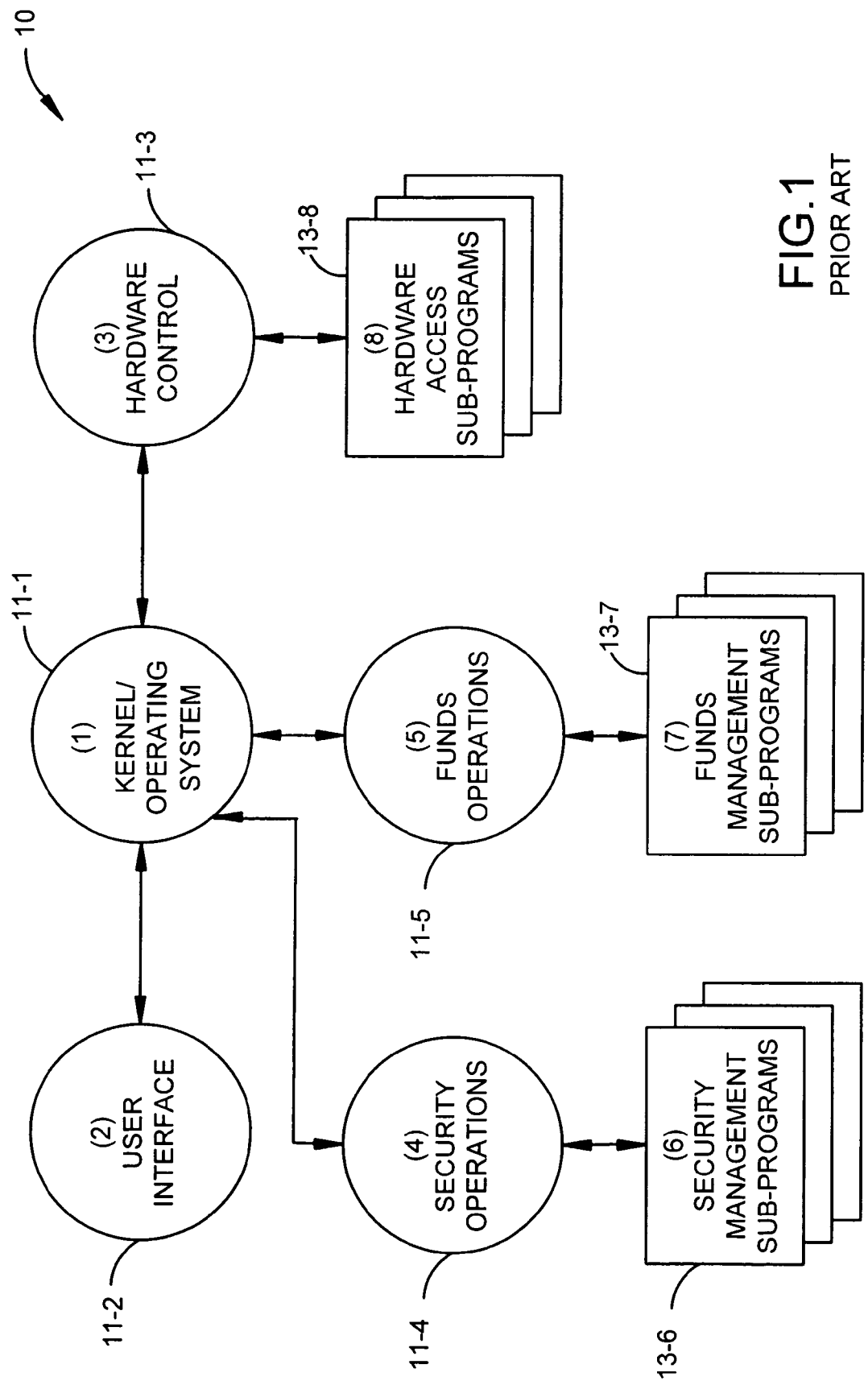
FIG. 1 is a diagram of an interaction of programs and sub-programs known in the art.
Figure 2:
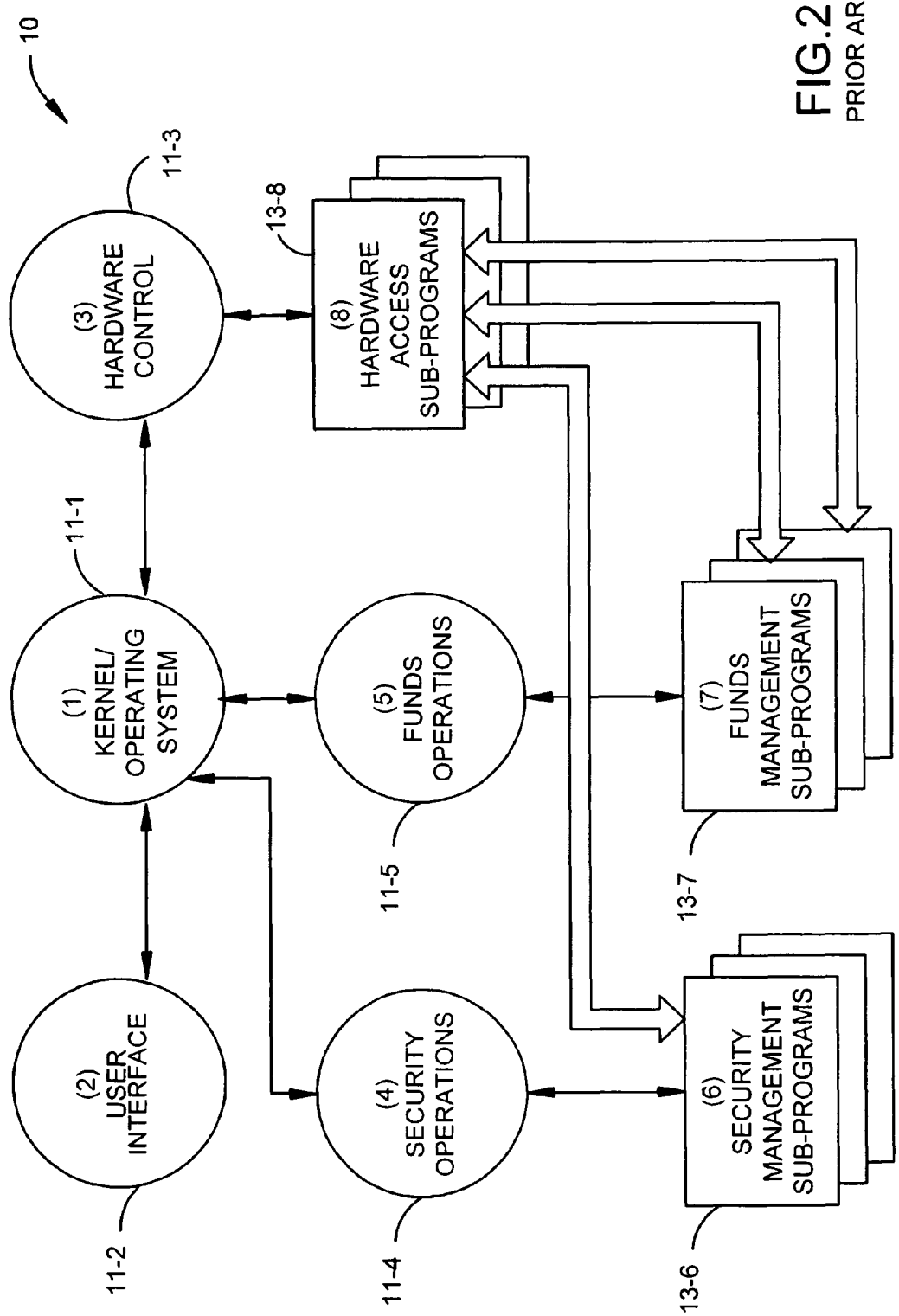
FIG. 2 is a diagram of an undesirable interaction of programs and sub-programs known in the art.
Figure 3:
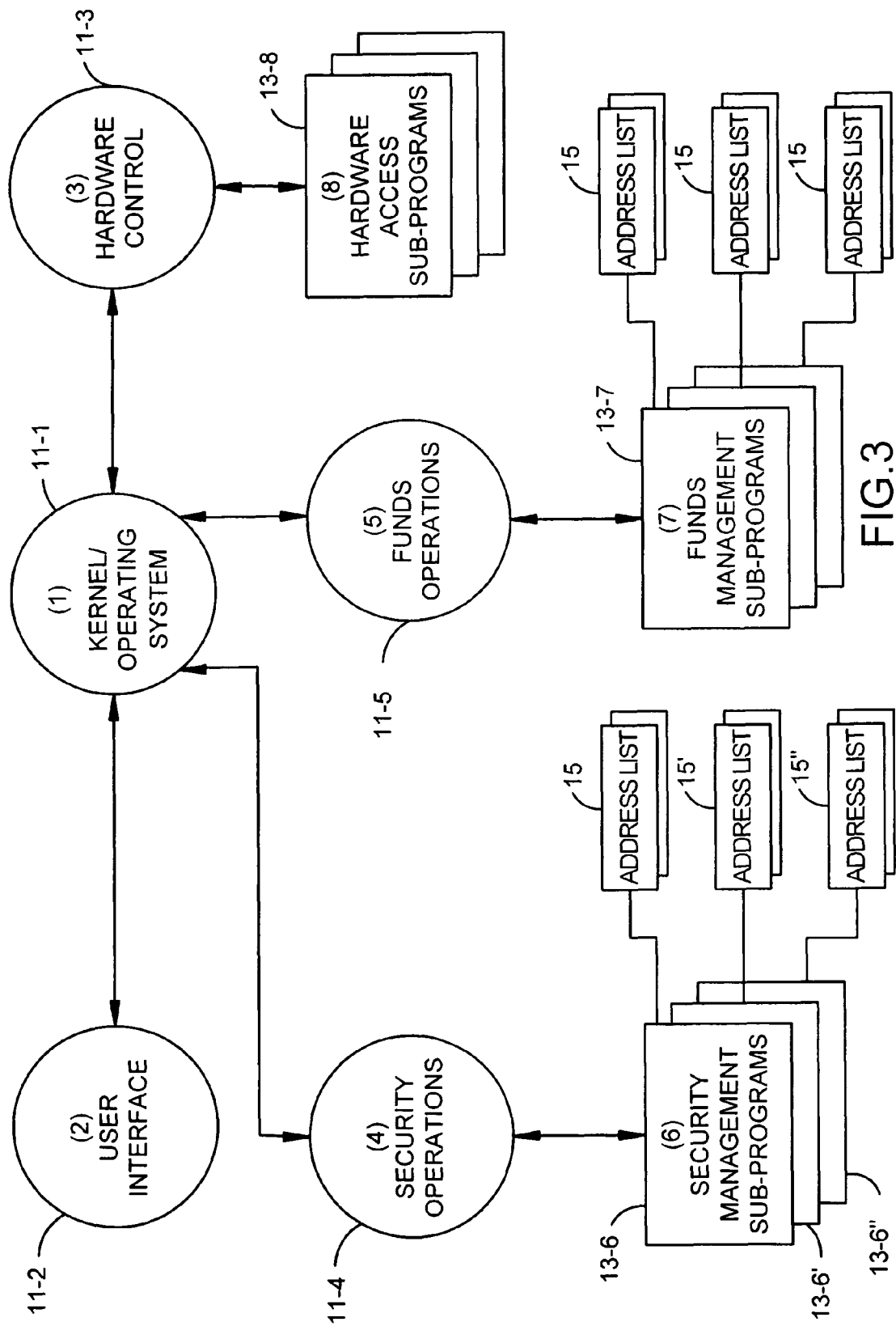
FIG. 3 is a diagram of an exemplary embodiment of an address list according to the invention.

Referring to FIG. 3, there is illustrated a logical diagram of a software system for practicing an exemplary embodiment of the invention. As shown, each sub-program 13-6 to 13-8 is coupled to one or more address lists 15. Each address list 15 contains a listing of each entity, whether a program or sub-program, that is permitted to invoke code contained in the associated sub-program. When a request to execute code contained in a sub-program is received by a sub-program, the request can be authenticated by examining the return address in the request and comparing it to the appropriate address lists. When a request to invoke code cannot be authenticated, various actions may be taken, as described more fully below, to prevent the unauthorized execution of the receiving sub-program.

With continued reference to FIG. 3, it is evident that each sub-program 13-6 to 13-8 can be formed of one or more sub-programs. At least one address list 15, 15', 15" can be associated with each sub-program, for example 13-6, 13-6', 13-6", respectively. In an exemplary embodiment, the sub-programs 13-6 to 13-8 are stored on memory internal to the microprocessor that is to execute the code forming the sub-programs 13-6 to 13-8. Preferably, the memory is formed of flash memory. Storing the sub-programs 13-6 to 13-8 in flash memory accessible to the microprocessor serves to reduce the ability of outside entities to retrieve or otherwise query the contents of the sub-programs 13-6 to 13-8.

When executing, each sub-program 13-6 to 13-8 is capable of accessing data stored in memory. Preferably, such data is likewise stored in flash memory internal to the microprocessor. Likewise, each address list 15 is stored in memory accessible to the address list's 15 corresponding sub-program 13. Each address list contains, at a minimum, the memory addresses/address ranges corresponding to the memory in which is stored the programs 11 or sub-programs 13 with permission to access the sub-program 11 associated with the address list 15.

For purposes of clarity, the discussion of the invention that follows employs the following naming convention. An entity, formed of either a program 11 or sub-program 13, that calls or otherwise invokes a sub-program 13 is referred to as a "calling program 11". Conversely, a sub-program 13 that receives a request from a calling program 11 is referred to as a "receiving sub-program 13".

When a calling program 11 calls a receiving sub-program 13, data is loaded onto the stack by the calling program 11. The data loaded onto the stack includes a return address and various parameters passed as arguments to the receiving sub-program 13. The receiving sub-program 13 reads the parameters off of the stack as well as the return address. As described more fully below, the parameters are utilized by the receiving sub-program 13 to carry out the operations requested of it. When the receiving sub-program 13 is finished its requested operations, it passes control back to the calling program 11 from which it was called at the address specified in the stack as the return address. Typically, a calling program 11 puts a return address onto the stack that specifies the next register in memory after the register containing the last command for calling the receiving sub-program 13. As a result, control is returned to the calling program 11 or sub-program 13 at the next command in memory after the call to the receiving sub-program 13. As is evident, the return address loaded onto the stack is an address located within the range of addresses in which is stored the calling program 11 or sub-program 13.

It is therefore possible for each receiving sub-program 13, when invoked by a calling program 11, to compare the return address in the stack passed to it to the address ranges in an associated address list 15. This comparison forms a process of authentication that serves to verify the origin of the invocation. With reference to FIG. 4, there is illustrated an exemplary code snippet forming part of a receiving sub-program 13. The receiving sub_program 13 illustrated, having a name "SUB_PROGRAM_NAME", returns a status value to the calling program 11 of type "return_value_type". The receiving sub-program 13 receives one or more parameters, including the return address of the calling program 11, and proceeds to the first "Begin". As coded, the illustrated receiving sub-program 13 performs an authentication operation by calling the function "AuthenticatedCaller( )". This exemplary authentication function passes the received return address as a parameter. If the value returned from the authentication function is equal to "true", the receiving sub-program 13 proceeds to perform the protected operations, possibly including the manipulation of protected data, and returns a status to the calling program 11 at the provided return address.

If the value returned from the authentication function is equal to "false", the sub-program does not perform the protected operations and can return a status to the calling program 11 indicating that the calling program 11 lacks permission to access the receiving sub-program 13. As noted above, the authentication function operates to access the address list or lists 15 associated with the receiving sub-program 13 and to verify the status of the calling program 11. If the return address value passed to the receiving sub-program 13 falls within one or more ranges specified in an associated address list 15, the receiving sub-program's 13 authentication function returns a value corresponding to true. Conversely, if the return address value passed to the receiving sub-program 13 does not fall within one or more ranges specified in an associated address list 15, the receiving sub-program's 13 authentication function returns a value corresponding to false.

If the address ranges, over which is stored a program 11 or sub-program 13 which is to have access to a sub-program, is stored in non-volatile memory, each address list 15 that specifies such an address range need not update the address range of the program 11 or sub-program 13 in a regular fashion. In instances where the address range over which is stored a calling program 11 which is to have access to a receiving sub-program 13 changes from time to time, the address lists 15 can be updated as appropriate, such as by the operating system program 11-1 for example, so as to accurately reflect the location of the programs 11, 13 to which invocation permission is extended.

With reference to FIG. 5, there is illustrated an alternative exemplary embodiment of a code snippet that operates to provide further data protection from unauthorized access and manipulation. While FIGS. 4 and 5 illustrate pseudo-code snippets, the executable code corresponding to the illustrated snippets is stored in a machine readable format, such as machine language code, preferably in sequential registers in memory. There is therefore a well defined memory location corresponding to the code forming each "Begin" statement. If, instead of invoking a receiving sub-program 13 at the memory location associated with the beginning of the receiving sub-program 13, a calling program 11 invoked a receiving sub-program 13 at another memory location, such as the location of the second "Begin" command, the receiving sub-program 13 would perform protected operations without having performed authentication.

An exemplary embodiment of a method to prevent such occurrences is illustrated in FIG. 5. Upon being invoked, the receiving sub-program 13 proceeds to perform protected operations. Preferably, the protected operations are performed on duplicate data. Specifically, any protected operations which operate to change the value of data first makes a copy of some or all of the data to be changed (the "duplicate data") and performs the protected operations on the copy of the data. Next, the authentication of the calling program 11 proceeds as before. In the present example, however, if the authentication function returns a value of "true" the portions of the duplicate data that need to be stored permanently are copied back to the protected data, and any required return parameters are retrieved from the duplicate data and placed on the stack. In the event that the authentication function returns a value of "false", the duplicate data is erased, or otherwise de-allocated, and the receiving sub-program 13 proceeds to return operation to the calling program 11. As a result, any attempt to invoke the receiving sub-program 13 at a point after the authentication function will result in the nonperformance of the protected operations. In this manner, unauthorized access to, or manipulation of, secure data is reduced.

Figure 6:
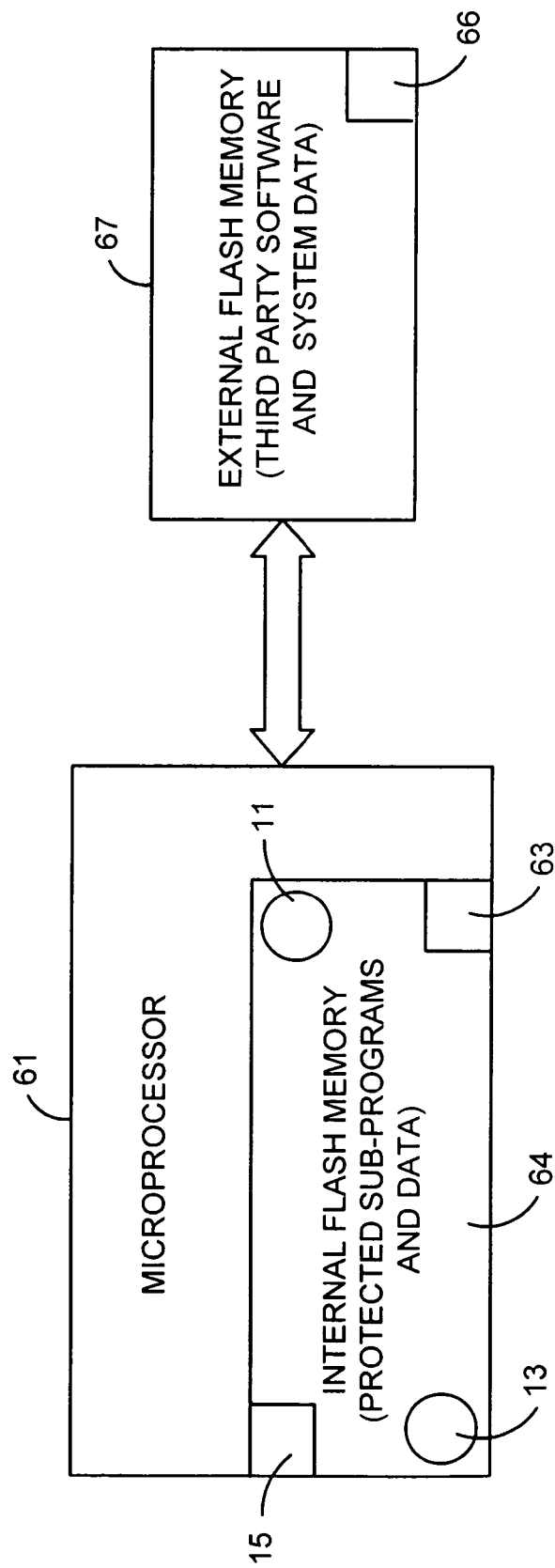
FIG. 6 is a diagram of an exemplary embodiment of a system for practicing the invention.

With reference to FIG. 6, there is illustrated a block diagram of an exemplary embodiment of a system for performing the method of the invention. As illustrated, a microprocessor 61 has internal memory 64, such as flash memory, on which are stored the sub-programs 13 that make use of protected data 63, as well as the protected data 63. Internal memory 64 may also be formed of RAM. In addition, programs 11 can be stored in internal memory 64. In an exemplary embodiment, one or more of the sub-programs may form a part of a postal security device (PSD). Likewise, the microprocessor 61 can form part of a PSD. An external memory 67 is coupled to microprocessor 61. External memory can be any form of computer memory including, but not limited to, flash memory and RAM. Being external, external memory 67 is vulnerable to unauthorized tampering and access. As a result, external data 66 and any other programs 11 or sub-programs 13 stored in external memory 66 are preferably not formed of data requiring security.

Typically, access and modification to data stored in internal memory 64, such as protected data 63, programs 11, sub-programs 13, and address lists 15 are accomplished using a J-Tag interface. When using such an interface, the interface is required to provide the microprocessor 61 with a pass code before being granted access to the internal memory 63. Failure to provide a proper pass code can result in the microprocessor 61 erasing the contents of internal memory 63.

While certain of the embodiments have been described in terms of flash memory storage of program instructions, the embodiments can alternatively be utilized with other appropriate storage technology such as RAM storage, EEPROM storage, ROM storage or mirrored RAM storage that mirrors flash when running. Additionally, as an alternative, the subprogram could be located within a secure device or even securely verifying that the application has not changed in the valid range. Such a modification prevents attackers from substituting programs with valid addresses. Furthermore, the subprogram does not just have to check the most recent stack entity. It could check for a specific stack sequence of function calls or even a specific order of functions that call the subprogram that could make it difficult for an attacker to deal with it. In other words, instead of a single parameter check, the system may check a number of parameters.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A computer implemented method for authenticating a sub-program request using a computer processor having operatively connected a first memory internal to the processor and a second memory external to the processor and associated memory addresses of the computer comprising:
   receiving, at a sub-program located in the first memory and executing in the computer processor, the request from an entity located in the second memory, said request comprising at least one parameter and a return memory address from the associated memory addresses associated with the entity;
   utilizing said return memory address and a memory address list located in the first memory that is associated with said sub-program to authenticate said external entity; and
   processing said request only if said external entity is authenticated.

2. The method of claim 1 wherein said memory address list comprises at least one memory address range.

3. The method of claim 2 wherein said utilizing comprises comparing said return memory address to said at least one memory address range.

4. The method of claim 1 wherein said processing comprises performing a plurality of operations on at least one datum.

5. The method of claim 4 comprising utilizing a microprocessor including the first memory, wherein the first memory includes an internal microprocessor memory that may be modified only using a protected port, and wherein the internal microprocessor memory includes said address list, said sub-program, and said at least one datum.

6. The method of claim 5 comprising utilizing a flash memory to store said address list, said sub-program, and said at least one datum.

7. The method of claim 1 wherein said processing said request comprises performing at least one function using a postal security device (PSD).

8. A computer implemented method for authenticating a sub-program request using a computer processor having operatively connected a first memory internal to the processor and a second memory external to the processor and associated memory addresses of the computer comprising:
  associating with a sub-program located in the first memory and executing in the computer processor at least one memory address list located in the first memory and comprising a memory address range from the associated memory addresses and associated with at least one valid requesting entity located in the second memory;
  receiving at said sub-program a request from a requesting entity comprising at least one parameter and a return memory address of said requesting entity;
  utilizing said return memory address and said at least one memory address list to determine if said requesting entity comprises one of said valid requesting entities; and
  performing at least one operation on at least one datum in response to said request only if said requesting entity comprises one of said valid requesting entities.

9. The method of claim 8 wherein said requesting entity comprises one of a program and another sub-program.

10. The method of claim 8 comprising utilizing a microprocessor comprising an internal memory in which is stored said sub-program and said at least one address list.

11. The method of claim 10 comprising utilizing an internal flash memory.

12. The method of claim 8 wherein said utilizing comprises comparing said return memory address to said at least one memory address range.

13. The method of claim 12 wherein said requesting entity is determined to comprise one of said valid requesting entities if said return memory address is within said at least one memory address range.

14. The method of claim 8 comprising returning control to said requesting entity at said return memory address.

15. A computer implemented method for authenticating a sub-program request using a computer processor having operatively connected a first memory internal to the processor and a second memory external to the processor and associated memory addresses of the computer comprising:
  associating with a sub-program located in the first memory and executing in the computer processor at least one memory address list located in the first memory and comprising a memory address range from the associated memory addresses and associated with at least one valid requesting entity located in the second memory;
  receiving at said sub-program a request from a requesting entity comprising at least one parameter and a return memory address of said requesting entity;
  copying at least one datum to at least one duplicate datum;
  performing at least one operation on said at least one duplicate datum in response to said request; and
  then utilizing said return memory address and said at least one memory address list to determine if said requesting entity comprises one of said valid requesting entities; and
  then erasing said at least one duplicate datum if said requesting entity does not comprise one of said valid requesting entities.

16. The method of claim 15 wherein said requesting entity comprises one of a program and another sub-program.

17. The method of claim 15 comprising utilizing a microprocessor comprising an internal memory in which is stored said sub-program and said at least one address list.

18. The method of claim 17 comprising utilizing an internal flash memory.

19. The method of claim 15 wherein said utilizing comprises comparing said return memory address to said at least one memory address range.

20. The method of claim 19 wherein said requesting entity is determined to comprise one of said valid requesting entities if said return memory address is within said at least one memory address range.

21. The method of claim 15 comprising returning a control to said requesting entity at said return memory address.

22. A program of machine-readable instructions, tangibly embodied on an information bearing medium and executable by a digital data processor, including a computer processor having operatively connected memory and associated memory addresses, to perform actions directed toward authenticating a request to a sub-program, the actions comprising:
  receiving at a sub-program located in an internal memory of the digital data processor and executing in the digital data processor a request from an external entity said request comprising at least one parameter and a return memory address of the entity;
  utilizing said return memory address and a memory address list associated with said sub-program to authenticate said external entity; and
  processing said request only if said external entity is authenticated.

23. The program of claim 22 wherein said memory address list comprises at least one memory address range.

24. The program of claim 23 wherein said utilizing comprises comparing said return memory address to said at least one memory address range.

25. The program of claim 22 wherein said processing comprises performing a plurality of operations on at least one datum.

26. A postal security device (PSD) comprising:
  a computer processor having operatively connected memory and associated memory addresses, the memory including instructions directing the computer process to:
  receive at a sub-program executing in the computer processor a request from an external entity, said request comprising at least one parameter and a return memory address from the associated memory addresses associated with the entity;
  utilize said return memory address and a memory address list associated with said sub-program to authenticate said external entity; and
  process said request only if said external entity is authenticated.

27. The method of claim 1 further comprising:
  utilizing a specific stack sequence of function calls to authenticate said external entity.

* * * * *